(12) United States Patent
Swift (10) Patent No.: US 8,215,203 B1
(45) Date of Patent: Jul. 10, 2012

(54) HANDLEBAR CLAMP TO ACCOMMODATE A MULTIPLICITY OF HANDLEBARS FOR A BICYCLE HAVING A HANDLEBAR POST AND A TRANSVERSE CLAMPING PLATE

(76) Inventor: Paul Swift, Kenosha, WI (US)

( * ) Notice: Subject to any disclaimer, the term of this patent is extended or adjusted under 35 U.S.C. 154(b) by 1180 days.

(21) Appl. No.: 11/345,974

(22) Filed: Feb. 1, 2006

(51) Int. Cl.
*B62K 21/12* (2006.01)
*B25G 3/18* (2006.01)
*F16B 21/00* (2006.01)

(52) U.S. Cl. ............ 74/551.8; 74/551.1; 74/551.3; 403/322.4

(58) Field of Classification Search .......... 74/551.1, 74/551.3, 551.8; 280/279; 403/322.4
See application file for complete search history.

(56) References Cited

U.S. PATENT DOCUMENTS

| | | | | |
|---|---|---|---|---|
| 5,226,341 A | * | 7/1993 | Shores ............ | 74/551.8 |
| 5,273,302 A | * | 12/1993 | Ureel ............. | 280/279 |
| 5,323,664 A | * | 6/1994 | Fairfield et al. ..... | 74/551.3 |
| 6,035,741 A | * | 3/2000 | Krizman, Jr. ....... | 74/551.8 |
| 6,920,806 B2 | * | 7/2005 | Cutsforth .......... | 74/551.8 |
| 7,685,904 B2 | * | 3/2010 | Cutsforth .......... | 74/551.3 |
| 2004/0016316 A1 | * | 1/2004 | Bechler ........... | 74/551.3 |
| 2005/0263980 A1 | * | 12/2005 | Bakhtin ........... | 280/279 |
| 2006/0099027 A1 | * | 5/2006 | Liao .............. | 403/322.4 |
| 2010/0186545 A1 | * | 7/2010 | Ray .............. | 74/551.8 |

FOREIGN PATENT DOCUMENTS

| | | | | |
|---|---|---|---|---|
| DE | 10351865 A1 | * | 9/2005 | |
| EP | 0 172 979 | * | 3/1986 | 74/551.1 |
| EP | 0 687 620 A1 | * | 12/1995 | |
| FR | 2 553 729 | * | 4/1985 | 74/551.3 |
| GB | 2 457 167 A | * | 8/2009 | |

* cited by examiner

*Primary Examiner* — Vinh T. Luong
(74) *Attorney, Agent, or Firm* — Thomas I. Rozsa (57) ABSTRACT

A handlebar clamp which can be removably affixed to the transverse clamping plate of any type of bicycle thereby allowing the bicycle to accommodate a multiplicity of handlebars. The handlebar clamp can be fitted to accommodate a multiplicity of different transverse clamping plates. The clamp is held in position by a quick-release attachment to the transverse clamping plate of a bicycle. The clamp has two jaws, the lower of which has at least two different sized partial openings, one each on its upper and lower sides, so that the lower jaw, upon rotation, accommodates different sized handlebars.

3 Claims, 5 Drawing Sheets

HANDLEBAR CLAMP TO ACCOMMODATE A MULTIPLICITY OF HANDLEBARS FOR A BICYCLE HAVING A HANDLEBAR POST AND A TRANSVERSE CLAMPING PLATE

BACKGROUND OF THE INVENTION

1. Field of the Invention

This invention relates to the field of bicycles and in particular, stationary bicycles such as spin type bicycles, indoor bicycles, pro upright bicycles, pro recumbent bicycles, V-BIKE bicycles, sport upright bicycles, sport recumbent bicycles, fitting bicycles, sizing bicycles, medical test bicycles, sports test bicycles, and REVMASTER bicycles which have a handlebar post and transverse clamping plate. This invention focuses on the field of handlebars used with such bicycles.

2. Description of the Prior Art

In general, all exercise bicycles which are available on the market today come with a pre-fitted handlebar. Some handlebars are horizontal and straight, comparable to the handlebar on a mountain bicycle. Other handlebars are bent in a reverse U-shape in the manner such as used with racing bicycles. Still other handlebar designs are generally U-shape with the U facing away from the rider, as used on a SCHWINN® exercise bicycle.

One problem in health clubs is that different customers may desire a different shape handlebar for a better fit and for use with the exercise bicycle. Since health clubs typically only carry one type of bicycle, the patron is forced to use a handlebar he/she may not want.

Therefore, there is a significant need for an apparatus which will permit a single bicycle frame which design includes a handlebar post and a transverse clamping plate to accommodate a multiplicity of different handlebar styles. There is also a significant need to enable fitting or sizing bicycles to quickly and efficiently accommodate alternative handlebars. There is also a significant need to enable medical and sports testing facilities to easily accommodate all sizes and types of users.

SUMMARY OF THE INVENTION

The present invention is a handlebar clamp which can be removably affixed to the transverse clamping plate of a bicycle so that the bicycle, through use of the present invention, can accommodate a multiplicity of handlebars and can also be fitted to accommodate a multiplicity of different transverse clamping plates to provide a better fit for the user. While the present invention is primarily for use with stationary exercise bicycles such as spin type bicycles, indoor bicycles, pro upright bicycles, pro recumbent bicycles, V-BIKE bicycles, sport upright bicycles, sport recumbent bicycles, fitting bicycles, sizing bicycles, REVMASTER bicycles, training ergometer type bicycles, and medical sports test bicycles, it can also be used with moving bicycles such as mountain bicycles and racing bicycles.

It has been discovered, according to the present invention, that if a series of clamping plates are each composed of an upper jaw and a lower jaw which can be attached together, and there is designed into the jaws a partial opening on opposing lengthwise edges so as to form a complete opening when the jaws are connected together, then a handlebar can be inserted into the area of the formed opening and retained therein by the attached jaws. By designing a multiplicity of pairs of jaws with different sizes and shapes of openings, the series of clamps can be used to retain a multiplicity of different types of handlebars.

It has further been discovered, according to the present invention, that if the jaws are retained together by a multiplicity of threaded bolts, the handlebar can be quickly changed by unscrewing the bolts and lifting off the top jaw so as to remove the presently retained handlebar and exchanging it with different handlebar.

It has also been discovered, according to the present invention, that if the jaws are hinged together with a quick release button or by a quick release clamping mechanism by which the jaws can be manually opened, then the handlebars can be even more rapidly replaced.

It has additionally been discovered, according to the present invention, that if the lower surface of the lower jaw is designed to accommodate one type of transverse clamping'plate adjacent one surface and another type of transverse clamping plate adjacent its opposite surface, then one jaw assembly can be used with two different types of transverse clamping plates.

It has further been discovered, according to the present invention, that if the lower jaw contains a female threaded opening, then the jaw assembly can be quickly attached to the opening in the transverse clamping plate by a threaded bolt. Similarly, the first clamping jaw assembly can be quickly replaced with another clamping jaw assembly by unscrewing the bolt and placing a second clamping jaw assembly onto the transverse clamping plate and threading the bolt into the female opening to affix it to the transverse clamping plate. It is also within the spirit and scope of the present invention to have a male threaded member extending upwardly from the lower jaw and have the male clamping member threaded with a nut to attach it to the opening in the transverse clamping plate.

It is therefore an object of the present invention to provide a series of removable clamps which can be removably affixed to the transverse clamping plate of a bicycle so that a series of different handlebars can be attached to the bicycle by means of one or more of the series of transverse clamping plates which are designed to accommodate a multiplicity of different handlebars.

It is a further object of the present invention to provide a clamping plate which can be opened so that the handlebar can be replaced with another handlebar or alternatively, provide a means for manually opening the clamping plate through a hingeable assembly so that the clamping plate is manually opened so that one handlebar can be removed and another handlebar inserted in place and thereafter, the clamping jaws lock together to retain the second handlebar.

It is a further object of the present invention to provide a handlebar which has a multiplicity of lower surface designs to accommodate a multiplicity of different transverse clamping plates on bicycles.

It is a further object of the present invention to provide a series of handlebar clamps which can be quickly attached to the transverse clamping plate of a bicycle and which can also be quickly removed and replaced within another in the series of handlebar clamps so that a multiplicity of different handlebars can be affixed to the bicycle.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated.

DETAILED DESCRIPTION OF THE PREFERRED EMBODIMENTS

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Figures 1, 2:
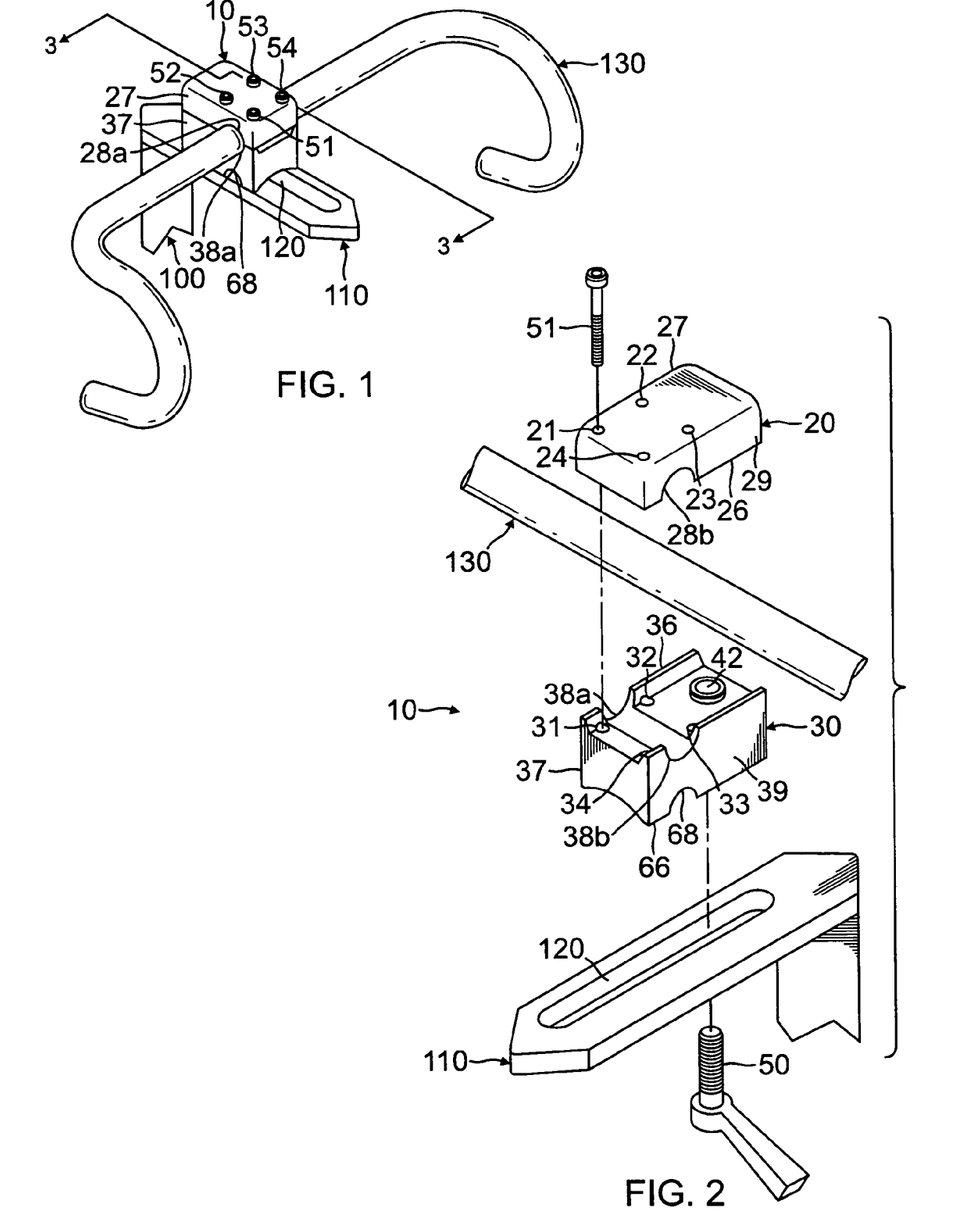
FIG. 1 is a perspective view of the entire assembly of a preferred embodiment of the present invention handlebar clamp which is affixed to the transverse clamping plate of a bicycle and is retaining a specific handlebar therein.
FIG. 2 is an exploded view of the present invention handlebar clamp and its attaching mechanism as illustrated in FIG. 1.

Referring first to FIG. 1, there is shown at 100 the upper portion of a handlebar post of a bicycle. Attached to the handlebar post 100 and extending transversely thereto is a transverse clamping plate 110. The transverse clamping plate 110 includes an elongated slotted opening 120 extending for a portion of the length of the transverse clamping plate 110. Different types of bicycles have different types of bicycle posts 100 and different types of transverse clamping plates 110. The present invention is used primarily with spin type bicycles, indoor bicycles, stationary exercise bicycles, such as pro upright bicycles, pro recumbent bicycles, V-BIKE bicycles, sport upright bicycles, sport recumbent bicycles, fitting bicycles, sizing bicycles, REVMASTER bicycles, training ergometer type bicycles, and medical sports test bicycles. Various manufacturers have their own design of their own transverse clamping plates 110.

Referring to FIG. 2, there is shown an exploded view of the present invention components which comprise a preferred embodiment of the present invention handlebar clamp. It will be appreciated that what is illustrated in FIG. 2 is one of a series of handlebar clamps which can have varying designs of openings to accommodate different types of handlebars, and also different types of lower surfaces on the lower jaw to accommodate different types of transverse clamping plates.

Referring to FIG. 2, one of the series of handlebar clamps is illustrated at 10. The handlebar clamp 10 comprises an upper jaw 20 having a multiplicity of openings 21, 22, 23, and 24 to respectively accommodate a mating bolt. The lower surface 26 of upper jaw 20 contains a first partial opening 28 which is on the first lengthwise surface 27 and on the second lengthwise surface 29 such that the first opening 28 of both surfaces are parallel and in alignment.

The handlebar clamp 10 further comprises a lower jaw 30 having a multiplicity of threaded openings 31, 32, 33, and 34 to respectively accommodate a mating threaded bolt. The upper surface 36 of lower jaw 30 contains a second partial opening 38 which is on the first lengthwise surface 37 and on the second lengthwise surface 39, which openings are parallel and in alignment with each other.

Figure 3:
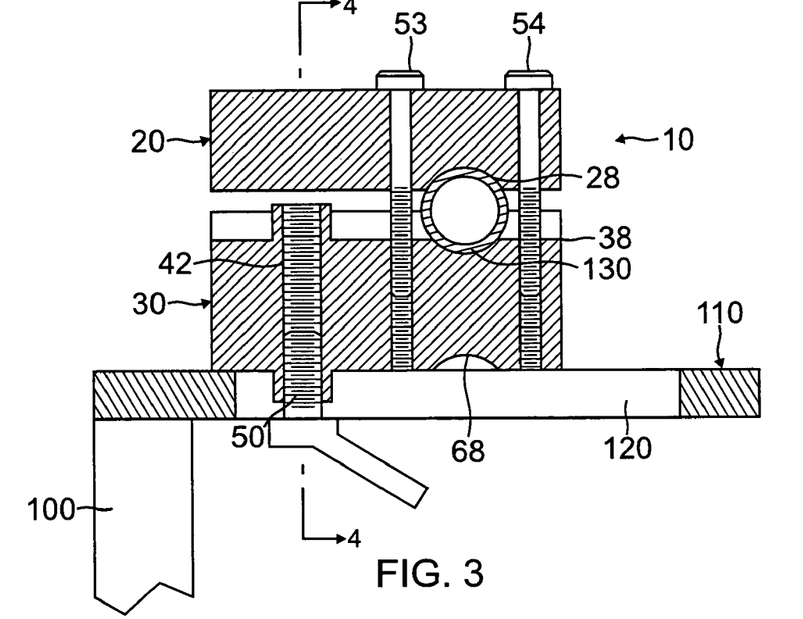
FIG. 3 is a cross-sectional view taken along Line 3-3 of FIG. 1.
Figure 4:
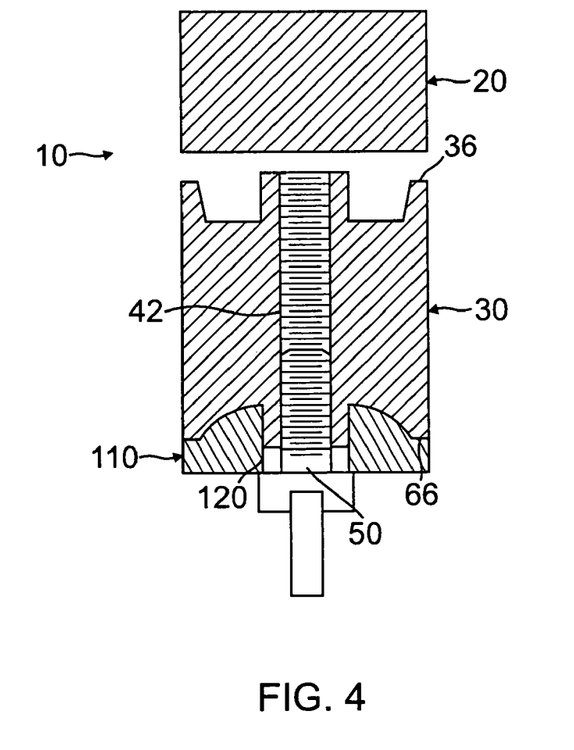
FIG. 4 is a cross-sectional view taken along Line 4-4 of FIG. 3.

Upper jaw 20 and lower jaw 30 are mated together so that lower surface 26 of upper jaw 20 is aligned with upper surface 36 of lower jaw 30 so that opening 21 is aligned with threaded opening 31, opening 22 is aligned with threaded opening 32, opening 23 is aligned with threaded opening 33 and opening 24 is aligned with threaded opening 34, and first partial opening 28 is aligned with second partial opening 38 so that partial openings 28 and 38 form a complete circle as illustrated in FIG. 3. Prior to joining upper jaw 20 with lower jaw 30, a handlebar 130 is inserted to stretch across lower partial opening 38 and the handlebar 130 is sandwiched between upper jaw 20 and lower jaw 30 as illustrated in FIG. 1.

Four threaded bolts 51, 52, 53 and 54 are respectively inserted into mated openings 21 and 31, 22 and 32, 23 and 33, and 24 and 34 so that the bolts are respectively threaded into the threaded openings 31, 32, 33 and 34 to hold the two jaws of the handlebar clamp together.

Alternatively, the upper jaw may have at least one transverse opening aligned with at least one threaded transverse opening in the lower jaw. A bolt is then inserted into the at least one opening in the upper jaw and threaded into the aligned at least one threaded opening in the lower jaw.

The reverse is also within the spirit and scope of the present invention. Therefore, the lower jaw may have at least one transverse opening and the upper jaw may have an aligned at least one threaded opening. A bolt is then inserted into the at least one opening in the lower jaw and threaded into the aligned at least one opening in the upper jaw.

Therefore, through use of the present invention, the entire circle created by partial openings 28 and 38 can be sized to fit any desired handlebar of any diameter so that the handlebar can be interchanged and the handlebar which is straight such as a mountain bike, curved as a racing handlebar as illustrated in FIG. 1, generally U-shaped as shown in the SCHWINN® exercise bicycle, or any other shape can be retained so that the horizontal portion of the handlebar 130 is grasped within the partial openings which form the full opening to grasp the handlebar when the upper and lower jaws are mated together as just discussed.

While four threaded bolts are illustrated, it will be appreciated that any number of threaded bolts can be used with the present invention.

As shown in FIG. 2, the lower surface 66 of lower section 30 also has a partial opening 68 on lengthwise edges 37 and 39, which partial opening extends across both surfaces so that they are in alignment and parallel to each other. Therefore, the lower section 30 can be rotated 180 degrees so that there is a different partial opening 68 which comes into alignment with partial opening 28 in the upper jaw in order to facilitate a different sized handlebar.

In addition, lower surface 66 is designed to be accommodated by a specific transverse clamping plate 110 and a different type of transverse clamping plate can be accommodated by rotating lower section 30 by 180 degrees so that upper surface 36 now goes into alignment with transverse clamping plate 110. Therefore, the same jaw can accommodate two different styles of clamping plates. As illustrated in FIG. 1 and FIG. 3, the lower jaw of lower section 30 is in alignment with clamping plate 110.

As further illustrated in FIG. 3, lower section 30 contains a large threaded opening 42 designed to accommodate a large threaded bolt 50. Large threaded bolt 50 fits through slotted opening 120 and transverse clamping plate 110 and thereafter, is threaded into a large threaded opening 42 of lower section 30 in order to affix the handlebar clamp 10 to the transverse clamping plate 110. It will be appreciated that the threads of the threaded openings 31, 32, 33, 34 and 42 are designed so that the bolts can be threaded into them regardless of the orientation of lower section 30 wherein surface 36 is up and 66 is down attached to the transverse clamping plate or alternatively, if it is rotated 180 degrees, so that surface 66 is facing upwardly adjacent upper section 20 and surface 36 is against the transverse clamping plate 110. While this is the preferred embodiment, alternatively, it is possible to have the male threaded member extending from lower surface 36 and have a nut attached to it to lock it in place on the transverse clamping plate.

Also, in view of the fact that the slotted opening is a lengthwise slot, the specific location of the handlebar clamp 10 can be adjusted to the desired longitudinal distance along the transverse clamping bar in order to provide a better fit and accommodate the wishes of the individual user.

Therefore, through the present invention, the handlebar clamp 10 permits any desired handlebar of any desired diameter and any desired configuration to be attached to the bicycle by simply changing the handlebar clamp or alternatively, changing the handlebar of a specific diameter so that it fits within the specific diameter of the two partial openings 28 and 38 or 28 and 68 to be sandwiched between the upper jaw 20 and the lower jaw 30.

In an alternative embodiment of the present invention as illustrated in FIGS. 5 through 8, upper jaw and lower jaw can be hingeably attached at a pair of respective end surfaces so that the opposite end surfaces are held together by mating attachment means which can be activated by activation means so that the upper jaw springs apart from the lower jaw in order to facilitate the insertion and removal of handlebar 130. After the desired handlebar is inserted, the jaws are clamped together and held in place by the mating attachment means. This alternative embodiment allows for the spring action by having the upper and lower jaws hingeably attached for more rapid changing of the handlebar.

Figure 5:
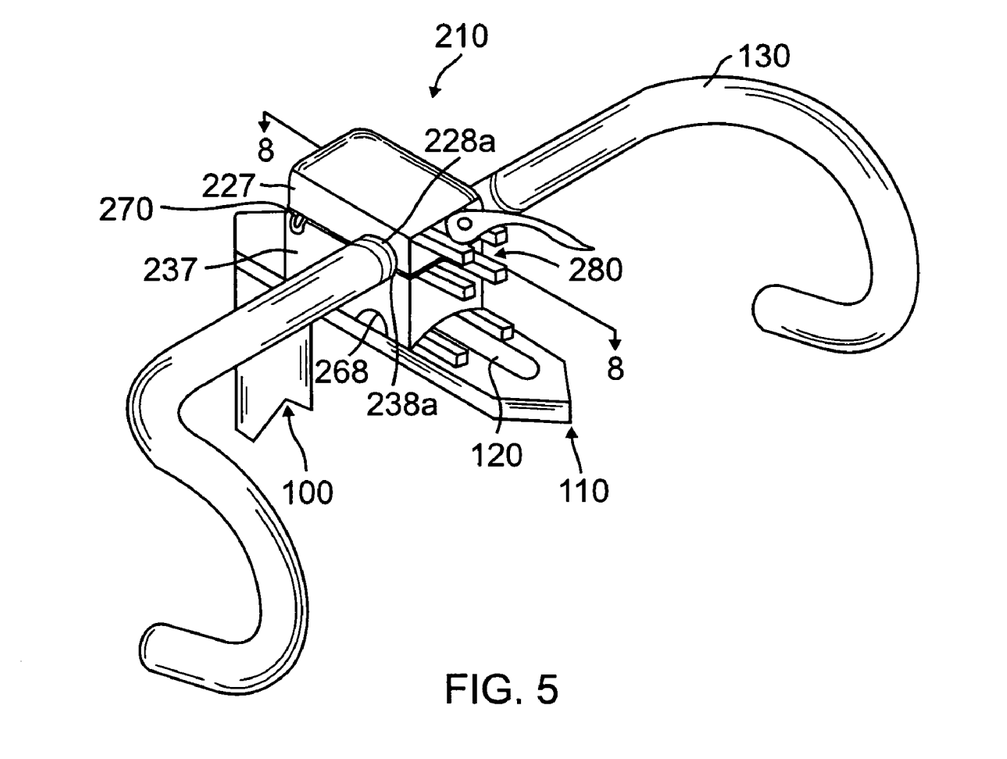
FIG. 5 is a perspective view of the entire assembly of an alternative embodiment of the present invention handlebar clamp which is affixed to the transverse clamping plate of a bicycle and is retaining a specific handlebar therein.

Referring to FIG. 5, there is shown at 100 the upper portion of a handlebar post of a bicycle. Attached to the handlebar post 100 and extending transversely thereto is a transverse clamping plate 110. The transverse clamping plate 110 includes an elongated slotted opening 120 extending for a portion of the length of the transverse clamping plate 110. Different types of bicycles have different types of bicycle posts 100 and different types of transverse clamping plates 110. The embodiment of the present invention is also used primarily with spin type bicycles, indoor bicycles, stationary exercise bicycles, such as pro upright bicycles, pro recumbent bicycles, V-BIKE bicycles, sport upright bicycles, sport recumbent bicycles, fitting bicycles, sizing bicycles, REV-MASTER bicycles, training ergometer type bicycles, and medical sports test bicycles. Various manufacturers have their own design of their own transverse clamping plates 110.

Figure 6:
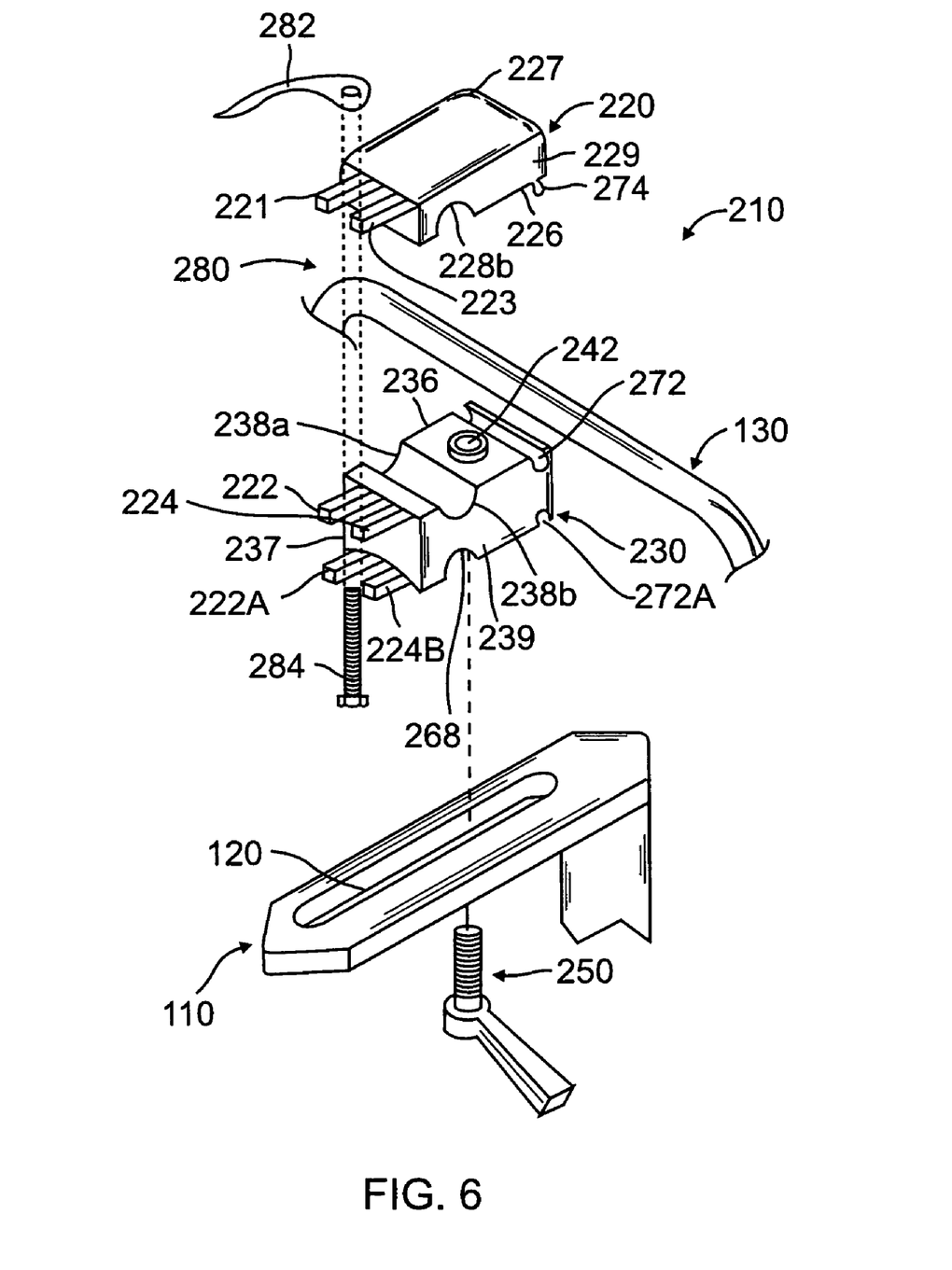
FIG. 6 is an exploded view of the alternative embodiment of present invention handlebar clamp and its attaching mechanism as illustrated in FIG. 5.

Referring to FIG. 6, there is shown an exploded view of the alternative embodiment of the present invention components which comprise a preferred embodiment of the present invention handlebar clamp. It will be appreciated that what is illustrated in FIG. 6 is one of a series of handlebar clamps which can have varying designs of openings to accommodate different types of handlebars, and also different types of lower surfaces on the lower jaw to accommodate different types of transverse clamping plates.

Referring to FIG. 6, one of the series of handlebar clamps is illustrated at 210. The handlebar clamp 210 comprises an upper jaw 220 having a pair of spaced apart receiving members 221 and 223 to accommodate the lever 282 of a quick release mechanism 280. The lower surface 226 of upper jaw 220 contains a first partial opening 228 which is on the first lengthwise surface 227 and on the second lengthwise surface 229 such that the first partial opening 228 of both surfaces are parallel and in alignment.

The handlebar clamp 210 further comprises a lower jaw 230 having a pair of spaced apart receiving members 222 and 224 to accommodate the bolt 284 of the quick release mechanism 280. The upper surface 236 of lower jaw 230 contains a second partial opening 238 which is on the first lengthwise surface 237 and on the second lengthwise surface 239, which openings are parallel and in alignment with each other.

Figure 7:
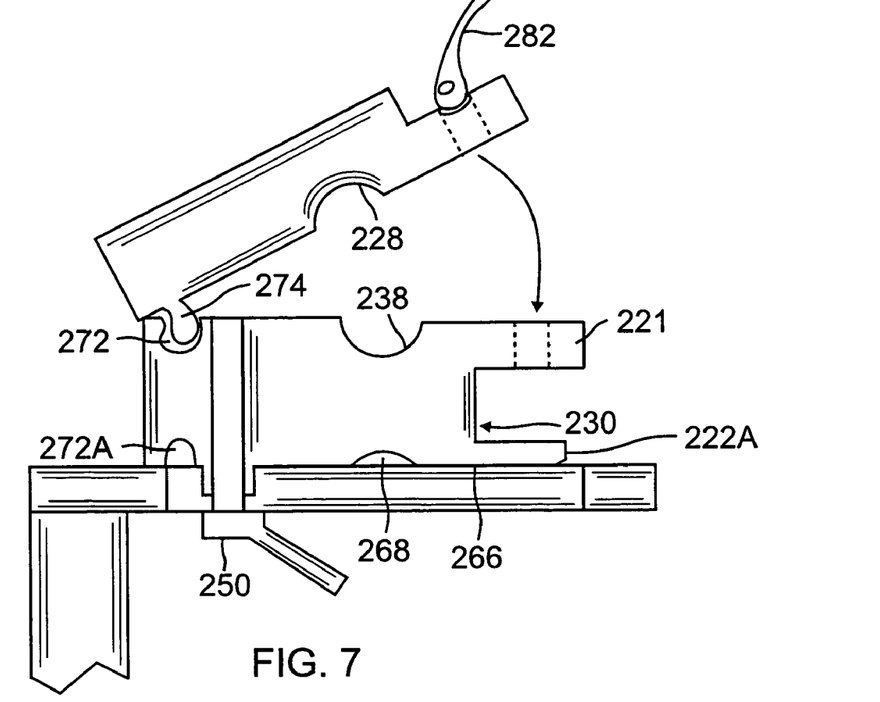
FIG. 7 is a side elevational view of the alternative embodiment of the present invention handlebar clamp and its attaching mechanism as illustrated in FIG. 5.
Figure 8:
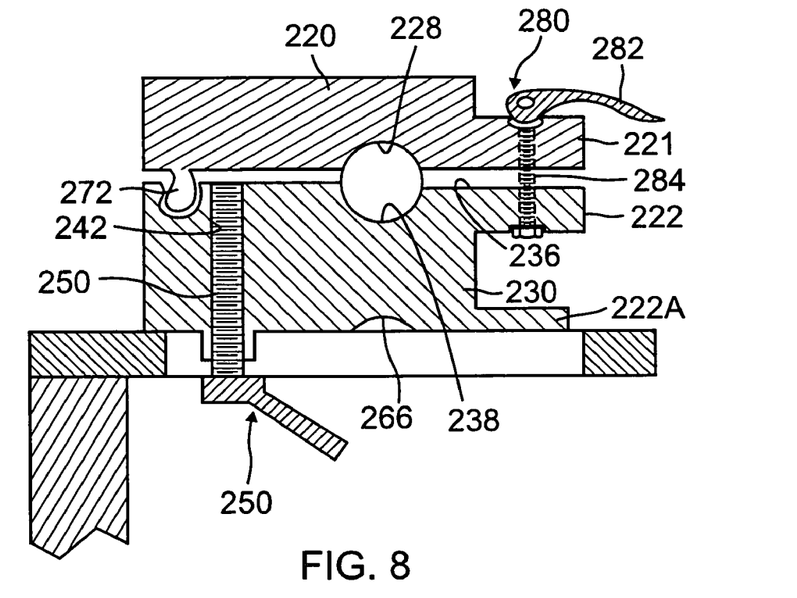
FIG. 8 is a cross-sectional view taken along Line 8-8 of FIG. 5.

Upper jaw 220 and lower jaw 230 are mated together so that lower surface 226 of upper jaw 220 is aligned with upper surface 236 of lower jaw 230. The two jaws 220 and 230 are interconnected by a mechanism 270. The upper surface 236 of lower jaw 230 contains a female receiving member 272 and the lower surface 226 of upper jaw 220 contains a male member 274 which is received into the female receiving member 272. As illustrated in the side elevational view of FIG. 7, the mechanism 270 enables upper jaw 220 to be manually rotated away from lower jaw 230, thereby causing the first partial opening 228 and the second partial opening 238 to be separated so that a handlebar can be inserted between the two jaws 220 and 230 at the location of the partial openings 228 and 238. Prior to joining upper jaw 220 with lower jaw 230, a handlebar 130 is inserted to stretch across lower partial opening 238 and the handlebar 130 is sandwiched between upper jaw 220 and lower jaw 230 as illustrated in FIG. 5. After the handlebar 130 is inserted at the location between partial openings 228 and 238, the lever 282 of the quick release mechanism 280 is rotated to the closed position as illustrated in FIGS. 5 and 8 so that the jaws 220 and 230 are clamped shut to retain the handlebar 130 between the location of partial openings 228 and 238 as illustrated in FIG. 5. To remove the handlebar 130, the lever 282 is rotated to the open position as illustrated in FIG. 7 so that the quick release mechanism 280 is opened and the jaws 220 and 230 can be manually opened so that the handlebar 130 can be removed and replaced with another handlebar.

Alternatively, the upper jaw may have the female receiving member of the mechanism and the lower jaw may have a male member of the mechanism. The device operates in the same manner to enable the two jaws 220 and 230 to be manually opened.

Therefore, through use of the present invention, the entire circle created by partial openings 228 and 238 can be sized to fit any desired handlebar of any diameter so that the handlebar can be interchanged and the handlebar which is straight such as a mountain bike, curved as a racing handlebar as illustrated in FIG. 5, generally U-shaped as shown in the SCHWINN® exercise bicycle, or any other shape can be retained so that the horizontal portion of the handlebar 130 is grasped within the partial openings which form the full opening to grasp the handlebar when the upper and lower jaws are mated together as just discussed.

As shown in FIG. 6, the lower surface 266 of lower section 230 also has a partial opening 268 on lengthwise edges 237 and 239, which partial opening extends across both surfaces so that they are in alignment and parallel to each other. Therefore, the lower section 230 can be rotated 180 degrees so that there is a different partial opening 268 which comes into alignment with partial opening 228 in the upper jaw in order to facilitate a different sized handlebar. The lower jaw 230 also has a pair of spaced apart receiving members 222A and 224A to accommodate the bolt 284 of the quick release mechanism 280 when the lower surface 230 is rotated 180 degrees. Lower surface 266 also has a female receiving member 272A to receive male member 274.

In addition, lower surface 266 is designed to be accommodated by a specific transverse clamping plate 110 and a different type of transverse clamping plate can be accommodated by rotating lower section 230 by 180 degrees so that upper surface 236 now goes into alignment with transverse clamping plate 110. Therefore, the same jaw can accommodate two different styles of clamping plates. As illustrated in FIG. 5 and FIG. 7, the lower surface 266 of lower section 230 is in alignment with clamping plate 110.

As further illustrated in FIG. 8, lower section 230 contains a large threaded opening 242 designed to accommodate a large threaded bolt 250. Large threaded bolt 250 fits through slotted opening 120 and transverse clamping plate 110 and thereafter, is threaded into a large threaded opening 242 of lower section 230 in order to affix the handlebar clamp 210 to the transverse clamping plate 110. While this is the preferred embodiment, alternatively, it is possible to have the male threaded member extending from lower surface 236 and have a nut attached to it to lock it in place on the transverse clamping plate.

Also, in view of the fact that the slotted opening is a lengthwise slot, the specific location of the handlebar clamp 210 can be adjusted to the desired longitudinal distance along the transverse clamping bar in order to provide a better fit and accommodate the wishes of the individual user.

Therefore, through the present invention, the handlebar clamp 210 permits any desired handlebar of any desired diameter and any desired configuration to be attached to the bicycle by simply changing the handlebar clamp or alternatively, changing the handlebar of a specific diameter so that it fits within the specific diameter of the two partial openings 228 and 238 or 228 and 268 to be sandwiched between the upper jaw 220 and the lower jaw 230.

Through use of the present invention, a specific stationary bicycle, spin bicycle frame, pro upright bicycle, pro recumbent bicycle, V-bicycle, sport upright bicycles, sport recumbent bicycle, fitting bicycles, sizing bicycles, revmaster bicycles, training ergometer type bicycles, and medical sports test bicycles can be utilized with any multiplicity of a series of handlebar clamps having a given diameter to accommodate different handlebars. Also, a single handlebar clamp which has the most common diameters for handlebars of the type used with exercise bicycles can be kept. Further, handlebars can be pre-attached to a specific handlebar clamp which can be kept in inventory or on a rack and thereafter, simply the entire assembly of the desired handlebar and its clamp can be attached to the slotted opening 120 of the transverse clamping plate 110 through large bolt 50 or 250. Therefore, the present invention easily facilitates using any multiplicity of handlebars of any desired shape and size for use with the same exercise bicycle, thereby enabling a health club to accommodate or better fit the wishes of any number of desired customers. The present invention substantially facilitates the efficiency with which handlebars can be changed so that the desired handlebar and desired configuration of handlebars are always available and any multiplicity of the same handlebars can be retained in inventory so that at any given time, all exercise bicycles can be using the same handlebar or any variation or combination of different handlebars for bicycles within the desires of the customers of the health club.

While the present invention is primarily focused on handlebars used with stationary bicycles, it will appreciated that the present invention can also be incorporated into ordinary bicycles which are used on the street such as mountain bicycles, racing bicycles or even standard children's bicycles.

Defined in detail the present invention is a handlebar clamp 10 to accommodate a multiplicity of handlebars 130 for use with a bicycle having a handlebar post 100 and a clamping plate 110 extending transversely to the handlebar post 100, the clamping plate 110 having an elongated opening 120 therethrough, the handlebar clamp 10 comprising: (a) an upper jaw 20 having a multiplicity of spaced apart transverse openings 21, 22, 23, 24 extending through the upper jaw 20, the upper jaw 20 including parallel first and second opposite lengthwise walls 27, 29, the first lengthwise wall 27 having a lower surface 26 containing a first partial opening 28a and the second lengthwise wall 29 having a lower surface 26 containing a second partial opening 28b, the partial openings 28a, 28b being oppositely disposed and parallel to each other; (b) a lower jaw 30 having a multiplicity of spaced apart transverse threaded openings 31, 32, 33, 34, each respective opening 31, 32, 33, 34 aligned with a respective opening 21, 22, 23, 24 in the upper jaw 20 when the jaws 20, 30 are mated together, the lower jaw 30 including parallel first and second opposite lengthwise walls 37, 39, the first lengthwise wall 37 having an upper surface 36 containing a first partial opening 38a and the second lengthwise wall 39 having an upper surface 36 containing a second partial opening 38b, the partial openings 38a, 38b being oppositely disposed and parallel to each other; (c) said lower jaw 30 further comprising a transverse large threaded opening 42 by which the lower jaw 30 is attached to said clamping plate 110 by means of a threaded bolt 50 extending through the slot 120 in said clamping plate 110 and being threaded into the large threaded opening 42 in the lower jaw 30 to thereby attach the lower jaw 30 to the clamping plate 110; and (d) said upper jaw 20 aligned with said lower jaw 30 so that their respective first walls 27, 37 touch each other so that their respective first partial openings 28a, 38a come together to form a generally circular shape, their respective second walls 29, 39 touch each other so that their respective second partial openings 28b, 38b, come together to form a generally circular shape, a handlebar 130 inserted into the partial openings 38a, 38b in the lower jaw 30 before the upper jaw 20 is aligned to the lower jaw 30 so that the handlebar 130 is retained in the generally circular shaped openings formed by the partial openings 38a, 38b, and a respective threaded bolt 51, 52, 53, 54 inserted into a respective opening 21, 22, 23, 24 in the upper jaw 20 and threaded into the aligned threaded opening 31, 32, 33, 34 in the lower jaw 30 so that the two jaws 20, 30 are retained together and retain the handlebar 130 between them; (e) whereby the partial openings 28a, 28b, 38a, 38b in said lengthwise walls 27, 29, 37, 39 of the upper and lower jaws 20, 30 are sized to correspond with and retain any desired handlebar 130.

Defined more broadly, the present invention is a handlebar clamp 10 to accommodate a multiplicity of handlebars 130 for use with a bicycle having a handlebar post 100 and a clamping plate 110, the handlebar clamp 10 comprising: (a) an upper jaw 20 having at least one transverse opening 120 extending through the upper jaw 20, the upper jaw 20 including parallel first and second opposite lengthwise walls 27, 29, the first lengthwise wall 27 having a lower surface 26 containing a first partial opening 28a and the second lengthwise 29 wall having a lower surface 26 containing a second partial opening 28b, the partial openings 28a, 28b being oppositely disposed and parallel to each other; (b) a lower jaw 30 having at least one transverse threaded opening 31 aligned with the at least one transverse opening 21 in the upper jaw 20 when the jaws 20, 30 are mated together, the lower jaw 30 including parallel first and second opposite lengthwise walls 37, 39, the first lengthwise wall 37 having an upper surface 36 containing a first partial opening 38*a* and the second lengthwise wall 39 having an upper surface 36 containing a second partial opening 38*b*, the partial openings 38*a*, 38*b* being oppositely disposed and parallel to each other; (c) said lower jaw 30 further comprising means 42 by which the lower jaw 30 is attached to said clamping plate 110; and (d) said upper jaw 20 aligned with said lower jaw 30 so that their respective first walls 27, 37 are aligned so that their respective first partial openings 28*a*, 38*a* form a portion of a circle, their respective second walls 29, 39 are aligned so that their respective second partial openings 28*b*, 38*b* form a portion of a circle, a handlebar 130 inserted into the partial openings 38*a*, 38*b* in the lower jaw 30 before the upper jaw 20 is aligned to the lower jaw 30 so that the handlebar 130 is retained in the portion of a circle formed by the partial openings 38*a*, 38*b* a bolt 51 inserted through the at least one opening 21 in the upper jaw 20 and threaded into the aligned at least one threaded opening 31 in the lower jaw 30 so that the two jaws 20, 30 are retained together and retain the handlebar 130 between them; (e) whereby the partial openings 28*a*, 28*b*, 38*a*, 38*b* in said lengthwise walls 27, 29, 37, 39 of the upper and lower jaws 20, 30 are sized to correspond with and retain any desired handlebar 130.

Defined even more broadly, the present invention is a handlebar clamp 10 to accommodate a multiplicity of handlebars 130 for use with a bicycle having a handlebar post 100 and a clamping plate 110, the handlebar clamp 10 comprising: (a) an upper jaw 20 having at least one threaded transverse opening 120 extending through the upper jaw 20, the upper jaw 20 including parallel first and second opposite lengthwise walls 27, 29, the first lengthwise wall 27 having a lower surface 26 containing a first partial opening 28*a* and the second lengthwise wall 29 having a lower surface 26 containing a second partial opening 28*b*, the partial openings 28*a*, 28*b* being oppositely disposed and parallel to each other; (b) a lower jaw 30 having at least one transverse opening 31 aligned with the at least one threaded transverse opening 21 in the upper jaw 20 when the jaws 20, 30 are mated together, the lower jaw 30 including parallel first and second opposite lengthwise walls 37, 39, the first lengthwise wall 37 having an upper surface 36 containing a first partial opening 38*a* and the second lengthwise wall 39 having an upper surface 36 containing a second partial opening 38*b*, the partial openings 38*a*, 38*b* being oppositely disposed and parallel to each other; (c) said lower jaw 30 further comprising means 42 by which the lower jaw 30 is attached to said clamping plate 110; and (d) said upper jaw 20 aligned with said lower jaw 30 so that their respective first walls 27, 37 are aligned so that their respective first partial openings 28*a*, 38*a* form a portion of a circle, their respective second walls 29, 39 are aligned so that their respective second partial openings 28*b*, 38*b* form a portion of a circle, a handlebar 130 inserted into the partial openings 38*a*, 38*b*, 68 in the lower jaw 30 before the upper jaw 20 is aligned to the lower jaw 30 so that the handlebar 130 is retained in the portion of a circle formed by the partial openings 38*a*, 38*b*, a bolt 51 inserted through the at least one opening 31 in the lower jaw 30 and threaded into the aligned at least one threaded opening 21 in the upper jaw 20 so that the two jaws 20, 30 are retained together and retain the handlebar 130 between them; (e) whereby the partial openings 28*a*, 28*b*, 38*a*, 38*b* in said lengthwise walls 27, 29, 37, 39 of the upper and lower jaws 20, 30 are sized to correspond with and retain any desired handlebar 130.

Defined alternatively in detail, the present invention is a handlebar clamp 210 to accommodate a multiplicity of handlebars 130 for use with a bicycle having a handlebar post 100 and a clamping plate 110 extending transversely to the handlebar post 110, the clamping plate 110 having an elongated opening 120 therethrough, the handlebar clamp 210 comprising: (a) an upper jaw 220 having a means 221, 223 for receiving a closing lever 282 of a release mechanism 280 and having one mating member 274 of an actuation means 270 at a location remote from the means for receiving the release mechanism 280, the upper jaw 220 including parallel first and second opposite lengthwise walls 227, 229, the first lengthwise wall 227 having a lower surface 226 containing a first partial opening 228*a* and the second lengthwise wall 229 having a lower surface 226 containing a second partial opening 228*b*, the partial openings 228*a*, 228*b* being oppositely disposed and parallel to each other; (b) a lower jaw 230 having means for receiving a mating portion 222, 222*a*, 224, 224*b* of a release mechanism 280 and a second mating member 272, 272*a* of an actuation means 270 at a location remote from the means for receiving the mating portion 222, 222*a*, 224 224*b* of a release mechanism 280, the lower jaw 230 including parallel first and second opposite lengthwise walls 237, 239, the first lengthwise wall 237 having an upper surface 236 containing a first partial opening 238*a* and the second lengthwise wall 239 having an upper surface 236 containing a second partial opening 238*b*, the partial openings 238*a*, 238*b* being oppositely disposed and parallel to each other: (c) the lower jaw 230 further comprising a means 280 by which the lower jaw 230 is attached to the clamping plate 110 by means of a bolt 284 extending through the elongated opening 120 in the clamping plate 110 and being held in place by the lever 282 of the release mechanism 280; and (d) the upper jaw 220 aligned with the lower jaw 230 so that their respective first walls 227, 237 touch each other so two of the mating members 272, 272*a*, 274 of the actuation means 270 are brought together and the lever 282 and mating portion 221, 222, 222*a*, 223, 224, 224*b* of the release mechanism 280 are brought together, and that their respective first partial openings 228*a*, 238*a* come together to form a generally circular shape, their respective second walls 229, 239 touch each other so that their respective second partial openings 228*b*, 238*b*, 268 come together to form a generally circular shape, a handlebar 130 inserted into the partial openings 228*b*, 238*b*, 268 in the lower jaw 230 before the upper jaw 220 is aligned to the lower jaw 230 so that the handlebar 130 is retained in the generally circular shaped openings formed by the partial openings 228*a*, 238*a*, 228*b*, 238*b*, 268, and when the release mechanism 280 is in a closed position the handlebar 130 is clamped between the two jaws 220, 230 and when the release mechanism 280 is in an open position, the two jaws 220, 230 are manually rotated apart so that the handlebar 130 can be removed; (e) whereby the partial openings 228*a*, 238*a*, 228*b*, 238*b*, 268 in the lengthwise walls 227, 237, 229, 239 of the upper and lower jaws 220, 230 are sized to correspond with and retain any desired handlebar 130.

Defined alternatively and more broadly, the present invention is a handlebar clamp 120 to accommodate a multiplicity of handlebars 130 for use with a bicycle having a handlebar post 100 and a clamping plate 110, the handlebar clamp 210 comprising: (a) an upper jaw 220 having a means 221, 223 for receiving a closing lever 282 of a release mechanism 280 and having one mating member 274 of an actuation means 270, the upper jaw 220 including parallel first and second opposite lengthwise walls 227, 229, the first lengthwise wall 227 having a lower surface 226 containing a first partial opening 228a and the second lengthwise wall 229 having a lower surface 226 containing a second partial opening 228b, the partial openings 228a, 228b being oppositely disposed and parallel to each other; (b) a lower jaw 230 having means for receiving a mating portion 222, 222a, 224, 224b of a release mechanism 280 and a second mating member 272, 272a of an actuation means 270, the lower jaw 230 including parallel first and second opposite lengthwise walls 237, 239, the first lengthwise wall 237 having an upper surface 236 containing a first partial opening 238a, 268 and the second lengthwise wall 239 having an upper surface 236 containing a second partial opening 238b, 268, the partial openings 238a, 238b, 268 being oppositely disposed and parallel to each other; (c) the lower jaw 230 further comprising means 280 by which the lower jaw 230 is attached to the clamping plate 110 and (d) the upper jaw 220 aligned with the lower jaw 230 so that their respective first walls 227, 237 touch each other so the two mating members 272, 272a, 274 of the spring actuation means 270 are brought together and the lever 282 and mating portion 221, 222, 222a, 223, 224, 224b of the release mechanism 280 are brought together, and that their respective first partial openings 228a, 238a come together to form a generally circular shape, their respective second walls 229, 239 touch each other so that their respective second partial openings 228b, 238b, 268 come together to form a generally circular shape, a handlebar 130 inserted into the partial openings 238a, 238b, 268 in the lower jaw 230 before the upper jaw 220 is aligned to the lower jaw 230 so that the handlebar 130 is retained in the generally circular shaped openings formed by the partial openings 228a, 228b, 238a, 238b, 268, and when the release mechanism 280 is in a closed position the handlebar 130 is clamped between the two jaws 220, 230 and when the release mechanism 280 is in an open position, the two jaws 220, 230 are manually rotated apart so that the handlebar 130 can be removed; (e) whereby the partial openings 228a, 228b, 238a, 238b, 268 in the lengthwise walls 227, 229, 237, 239 of the upper and lower jaws 220, 230 are sized to correspond with and retain any desired handlebar 130.

Defined alternatively and even more broadly, the present invention is a handlebar clamp 210 to accommodate a multiplicity of handlebars 130 for use with a bicycle having a handlebar post 100 and a clamping plate 110, the handlebar clamp 210 comprising: (a) an upper jaw 220 having a means 221, 223 for receiving a closing mechanism 282 of a release mechanism 280 and having one mating member 274 of an actuation means 270, the upper jaw 220 including parallel first and second opposite lengthwise walls 227, 229, the first lengthwise wall 227 having a lower surface 226 containing a first partial opening 228a and the second lengthwise wall 229 having a lower surface 226 containing a second partial opening 228b, the partial openings 228a, 228b being oppositely disposed and parallel to each other; (b) a lower jaw 230 having means for receiving a mating portion 222, 222a, 224, 224b, of a release mechanism 280 and a second mating member 272, 272a of an actuation means 270, the lower jaw 230 including parallel first and second opposite lengthwise walls 237, 239, the first lengthwise wall 237 having an upper surface 236 containing a first partial opening 238a and the second lengthwise wall 239 having an upper surface 236 containing a second partial opening 238b, the partial openings 238a, 238b being oppositely disposed and parallel to each other; (c) the lower jaw 230 further comprising means 280 by which the lower jaw 230 is attached to the clamping plate 110; and (d) the upper jaw 220 aligned with the lower jaw 230 so that their respective first walls 227, 237 touch each other so the two mating members 272, 272a, 274 of the actuation means 270 are brought together and the closing mechanism 280 and mating portion 221, 222, 222a, 223, 224, 224b of the quick release mechanism 280 are brought together, and that their respective first partial openings 228a, 238a 268 come together to form a generally circular shape, their respective second walls 229, 239 touch each other so that their respective second partial openings 228b, 238, 268 come together to form a generally circular shape, a handlebar 130 inserted into the partial openings 238a, 238b, 268 in the lower jaw 230 before the upper jaw 220 is aligned to the lower jaw 230 so that the handlebar 130 is retained in the generally circular shaped openings formed by the partial openings 228a, 228b, 238a, 238b, 268, and when the release mechanism 280 is in a closed position the handlebar 130 is clamped between the two jaws 220, 230 and when the release mechanism 280 is in an open position, the two jaws 220, 230 are manually rotated apart so that the handlebar 130 can be removed; (e) whereby the partial openings 228a, 228b, 238a, 238b, 268 in the lengthwise walls 227, 229, 237, 239 of the upper and lower jaws 220, 230 are sized to correspond with and retain any desired handlebar 130.

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus or method shown is intended only for illustration and disclosure of an operative embodiment and not to show all of the various forms or modifications in which this invention might be embodied or operated.

The present invention has been described in considerable detail in order to comply with the patent laws by providing full public disclosure of at least one of its forms. However, such detailed description is not intended in any way to limit the broad features or principles of the present invention, or the scope of the patent to be granted. Therefore, the invention is to be limited only by the scope of the appended claims.

What is claimed is:

1. A handlebar clamp to accommodate a multiplicity of handlebars for use with a bicycle having a handlebar post and a clamping plate extending transversely to the handlebar post, the clamping plate having an elongated opening therethrough, the handlebar clamp comprising:

a. an upper jaw having spaced apart receiving members to accommodate a closing lever of a quick release and having one mating member of a mechanism to interconnect the upper jaw to a lower jaw at a location remote from the spaced apart receiving members, the upper jaw including parallel first and second opposite lengthwise walls, the first lengthwise wall having a lower surface containing a first partial opening and the second lengthwise wall having a lower surface containing a second partial opening, the partial openings being oppositely disposed and parallel to each other;

b. the lower jaw formed as a separate part from the upper jaw, the lower jaw having a mating portion of said quick release and a second mating member of a mechanism to interconnect the upper jaw to the lower jaw at a location remote from the spaced apart receiving members, the lower jaw including parallel first and second opposite lengthwise walls, the first lengthwise wall having an upper surface containing a first partial opening and the second lengthwise wall having an upper surface containing a second partial opening, the partial openings being oppositely disposed and parallel to each other, the first and second openings of the lower jaw and the first and second openings of the upper jaw formed into two separate components;

c. said lower jaw further comprising a transverse threaded opening by which the lower jaw is attached to said clamping plate by a threaded bolt extending through the elongated opening in said clamping plate and being threaded into the threaded opening in the lower jaw to thereby attach the lower jaw to the clamping plate;

d. said upper jaw aligned with said lower jaw so that their respective first walls touch each other so the two mating members of the jaw connector are brought together and the lever and mating portion of the quick release are brought together, and that their respective first partial openings come together to form a generally circular shape, their respective second walls touch each other so that their respective second partial openings come together to form a generally circular shape, a handlebar having a first size inserted into the partial openings in the lower jaw before the upper jaw is aligned to the lower jaw so that the handlebar having a first size is retained in the generally circular shaped openings formed by the partial openings, and when the quick release is in a closed position the handlebar is clamped between the two jaws and when the quick release is in an open position, the handlebar having a first size is removably situated as the two jaws are manually rotated apart;

e. whereby the partial openings in said lengthwise walls of the upper and lower jaws are sized to correspond with and retain any desired handlebar; and f. the lower jaw further comprises a lower surface in the first lengthwise wall containing a third partial opening and a lower surface in the second lengthwise wall containing a fourth partial opening, the third and fourth partial openings being oppositely disposed and parallel to each other, whereby the lower jaw can be reversed so that when the upper jaw is aligned with the reversed lower jaw, the first partial opening in the upper jaw is aligned with the third partial opening in the lower jaw and the second partial opening in the upper jaw is aligned with the fourth partial opening in the lower jaw to form a respective generally circular shaped opening to retain a handlebar having a second size therebetween which is different from the handlebar having the first size retained when the respective first partial openings and second partial openings were mated together, the lower surface also having a member for receiving a mating portion of said quick release and a second mating member of said jaw connector.

2. A handlebar clamp to accommodate a multiplicity of handlebars for use with a bicycle having a handlebar post and a clamping plate, the handlebar clamp comprising:

a. an upper jaw having members for receiving a closing lever of a quick release and having one mating member of a mechanism to interconnect the upper jaw to a lower jaw, the upper jaw including parallel first and second opposite lengthwise walls, the first lengthwise wall having a lower surface containing a first partial opening and the second lengthwise wall having a lower surface containing a second partial opening, the partial openings being oppositely disposed and parallel to each other;

b. a lower jaw formed as a separate part from the upper jaw, the lower jaw having members for receiving a mating portion of said quick release and a second mating member of a mechanism to interconnect the upper jaw to the lower jaw, the lower jaw including parallel first and second opposite lengthwise walls, the first lengthwise wall having an upper surface containing a first partial opening and the second lengthwise wall having an upper surface containing a second partial opening, the partial openings being oppositely disposed and parallel to each other; the first and second openings of the lower jaw and the first and second openings of the upper jaw formed into two separate components;

c. said lower jaw further comprising a threaded opening by which the lower jaw is attached to said clamping plate through a threaded bolt extending through the clamping plate and into the threaded opening;

d. said upper jaw aligned with said lower jaw so that their respective first walls touch each other so the two mating members of the actuation members are brought together and the lever and mating portion of the quick release are brought together, and that their respective first partial openings come together to form a generally circular shape, their respective second walls touch each other so that their respective second partial openings come together to form a generally circular shape, a handlebar having a first size inserted into the partial openings in the lower jaw before the upper jaw is aligned to the lower jaw so that the handlebar having a first size is retained in the generally circular shaped openings formed by the partial openings, and when the quick release is in a closed position the handlebar having a first size is clamped between the two jaws and when the quick release is in an open position, the handlebar having a first size is removably situated as the two jaws are manually rotated apart;

e. whereby the partial openings in said lengthwise walls of the upper and lower jaws are sized to correspond with and retain any desired handlebar; and f. the lower jaw further comprises a lower surface in the first lengthwise wall containing a third partial opening and a lower surface in the second lengthwise wall containing a fourth partial opening, the third and fourth partial openings being oppositely disposed and parallel to each other, whereby the lower jaw can be reversed so that when the upper jaw is aligned with the reversed lower jaw, the first partial opening in the upper jaw is aligned with the third partial opening in the lower jaw and the second partial opening in the upper jaw is aligned with the fourth partial opening in the lower jaw to form a respective generally circular shaped opening to retain a handlebar having a second size therebetween which is different from the handlebar having a first size retained when the respective first partial openings and second partial openings were mated together, the lower surface also having a member for receiving a mating portion of a quick release and a second mating member of a jaw connector at a location remote from the mating portion of said quick release.

3. A handlebar clamp to accommodate a multiplicity of handlebars for use with a bicycle having a handlebar post and a clamping plate, the handlebar clamp comprising:

a. an upper jaw having members for receiving a closing lever of a quick release and having one mating member of a means to interconnect the upper jaw to the lower jaw, the upper jaw including parallel first and second opposite lengthwise walls, the first lengthwise wall having a lower surface containing a first partial opening and the second lengthwise wall having a lower surface containing a second partial opening, the partial openings being oppositely disposed and parallel to each other;

b. a lower jaw formed as a separate part from the upper jaw, the lower jaw having members for receiving a mating portion of said quick release and a second mating member of a means to interconnect the upper jaw to the lower jaw, the lower jaw including parallel first and second opposite lengthwise walls, the first lengthwise wall having an upper surface containing a first partial opening and the second lengthwise wall having an upper surface containing a second partial opening, the partial openings being oppositely disposed and parallel to each the first and second openings of the lower jaw and the first and second openings of the upper jaw formed into two separate components;

c. said lower jaw further comprising a threaded opening by which the lower jaw is attached to said clamping plate through a threaded bolt extending through the clamping plate and into the threaded opening;

d. said upper jaw aligned with said lower jaw so that their respective first walls touch each other so the two mating members of the jaw connector are brought together and the closing lever and mating portion of the quick release are brought together, and that their respective first partial openings come together to form a generally circular shape, their respective second walls touch each other so that their respective second partial openings come together to form a generally circular shape, a handlebar having a first size inserted into the partial openings in the lower jaw before the upper jaw is aligned to the lower jaw so that the handlebar having a first size is retained in the generally circular shaped openings fanned by the partial openings, and when the quick release is in a closed position the handlebar having a first size is clamped between the two jaws and when the quick release is in an open position, the handlebar having a first size is removably situated as the two jaws are manually rotated apart;

e. whereby the partial openings in said lengthwise walls of the upper and lower jaws are sized to correspond with and retain any desired handlebar; and f. the lower jaw further comprises a lower surface in the first lengthwise wall containing a third partial opening and a lower surface in the second lengthwise wall containing a fourth partial opening, the third and fourth partial openings being oppositely disposed and parallel to each other, whereby the lower jaw can be reversed so that when the upper jaw is aligned with the reversed lower jaw, the first partial opening in the upper jaw is aligned with the third partial opening in the lower jaw and the second partial opening in the upper jaw is aligned with the fourth partial opening in the lower jaw to form a respective generally circular shaped opening to retain a handlebar having a second size therebetween which is different from the handlebar having a first size retained when the respective first partial openings and second partial openings were mated together, the lower surface also having a member for receiving a mating portion of said quick release and a second mating member of a jaw connector.

* * * * *